United States Patent
Morohoshi et al.

(10) Patent No.: US 7,736,577 B2
(45) Date of Patent: Jun. 15, 2010

(54) STEREOLITHOGRAPHY APPARATUS AND STEREOLITHOGRAPHY METHOD

(75) Inventors: Kimitaka Morohoshi, Tokyo (JP); Toshio Teramoto, Tokyo (JP)

(73) Assignee: JSR Corporation, Tokyo (JP)

( * ) Notice: Subject to any disclaimer, the term of this patent is extended or adjusted under 35 U.S.C. 154(b) by 152 days.

(21) Appl. No.: 12/064,754

(22) PCT Filed: Aug. 17, 2006

(86) PCT No.: PCT/JP2006/316148

§ 371 (c)(1), (2), (4) Date: Feb. 25, 2008

(87) PCT Pub. No.: WO2007/023724

PCT Pub. Date: Mar. 1, 2007

(65) Prior Publication Data

US 2009/0261512 A1 Oct. 22, 2009

(30) Foreign Application Priority Data

Aug. 25, 2005 (JP) .............................. 2005-243924
Aug. 25, 2005 (JP) .............................. 2005-243925

(51) Int. Cl.
*B29C 35/04* (2006.01)
(52) U.S. Cl. .................. 264/401; 264/308; 425/375; 425/174.4; 425/356; 425/358
(58) Field of Classification Search ................. 264/401, 264/308; 425/375, 174.4
See application file for complete search history.

(56) References Cited

U.S. PATENT DOCUMENTS

| | | | | |
|---|---|---|---|---|
| 5,174,931 | A * | 12/1992 | Almquist et al. | 264/401 |
| 5,610,824 | A * | 3/1997 | Vinson et al. | 700/182 |
| 5,780,070 | A * | 7/1998 | Yamazawa et al. | 425/174.4 |
| 5,902,537 | A * | 5/1999 | Almquist et al. | 264/401 |
| 6,029,096 | A * | 2/2000 | Manners et al. | 700/120 |
| 6,048,487 | A * | 4/2000 | Almquist et al. | 264/401 |
| 6,764,636 | B1 * | 7/2004 | Allanic et al. | 264/401 |
| 7,568,904 | B2 * | 8/2009 | Koyagi et al. | 425/375 |
| 2002/0188369 | A1 * | 12/2002 | Guertin et al. | 700/119 |
| 2009/0220732 | A1 * | 9/2009 | Pham et al. | 428/114 |

FOREIGN PATENT DOCUMENTS

| | | |
|---|---|---|
| JP | 56 144478 | 11/1981 |
| JP | 62 35966 | 2/1987 |
| JP | 2000 225647 | 8/2000 |
| JP | 2000 263652 | 9/2000 |
| JP | 2001 287273 | 10/2001 |
| JP | 2002 103457 | 4/2002 |
| JP | 2005 131938 | 5/2005 |

* cited by examiner

*Primary Examiner*—Joseph S Del Sole
*Assistant Examiner*—David N Brown, II
(74) *Attorney, Agent, or Firm*—Oblon, Spivak, McClelland, Maier & Neustadt, L.L.P.

(57) ABSTRACT

A stereolithography apparatus that forms a three-dimensional model by sequentially laminating cured resin layers through repetition of a cycle of selectively applying light to liquid photocurable resin to form a cured resin layer, further applying liquid photocurable resin on the cured resin layer, and applying light to form a cured resin layer. The apparatus includes a table, a dispenser to supply the liquid photocurable resin onto the table, a recoater to apply the photocurable resin, and a controller to slow down a moving speed of the recoater based on a moving distance of the recoater during application operation of the recoater.

23 Claims, 7 Drawing Sheets

STEREOLITHOGRAPHY APPARATUS AND STEREOLITHOGRAPHY METHOD

TECHNICAL FIELD

The present invention relates to a stereolithography apparatus and a stereolithography method that form a cured resin layer by selectively applying light to liquid photocurable resin and laminate cured resin layers on one another to thereby create a three-dimensional model.

BACKGROUND ART

A photo-laminating stereolithography method (which is referred to hereinafter as a stereolithography method) forms a three-dimensional model based on data of cross sections that are obtained by slicing a three-dimensional model to be formed into a plurality of layers. Normally, a light ray is firstly applied to the liquid level of liquid photocurable resin in a region corresponding to the lowermost cross-section. The light-exposed part of the liquid level of the liquid photocurable resin is thereby cured, so that a cured resin layer in one cross section of a three-dimensional model is formed. Then, liquid photocurable resin that is not cured yet is coated at a given thickness on the surface of the cured resin layer. In this coating process, it is typical to soak the cured resin layer at a given thickness in the liquid photocurable resin that is filled in a resin bath. Further, a relatively small amount of the photocurable resin may be applied all over the surface using a recoater every time one cured resin layer is formed. After that, a laser beam traces a given pattern on the surface, thus curing a light-exposed part of the coating layer. The cured part is integrally laminated onto the cured layer below. Subsequently, the light exposure and the coating of liquid photocurable resin are repeated, with a cross section treated in the light exposure process being changed with an adjacent cross section, thereby forming a desired three-dimensional model (cf. Patent documents 1 and 2).

[Patent Document 1]
Japanese Unexamined Patent Application Publication No. 56-144478

[Patent Document 2]
Japanese Unexamined Patent Application Publication No. 62-35966

DISCLOSURE OF THE INVENTION

Problems to be Solved by the Invention

Figure 6A:
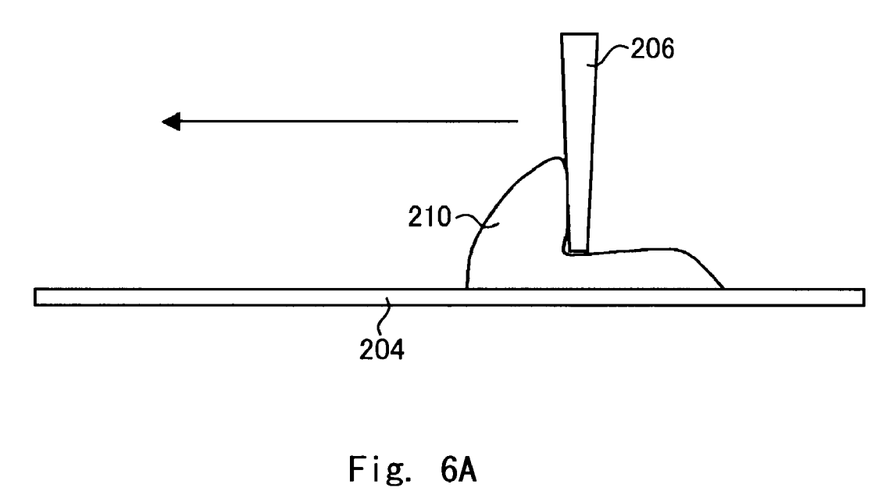
FIG. 6A A view showing a change in the thickness of a resin layer in a stereolithography apparatus according to a related art.
Figure 6B:
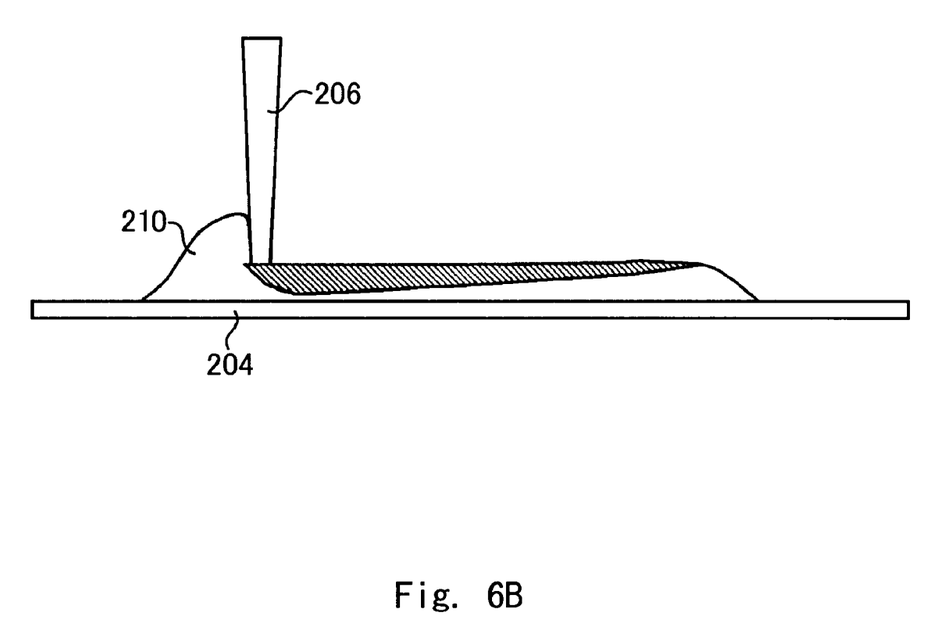
FIG. 6B A view showing a change in the thickness of a resin layer in a stereolithography apparatus according to a related art.
Figure 6C:
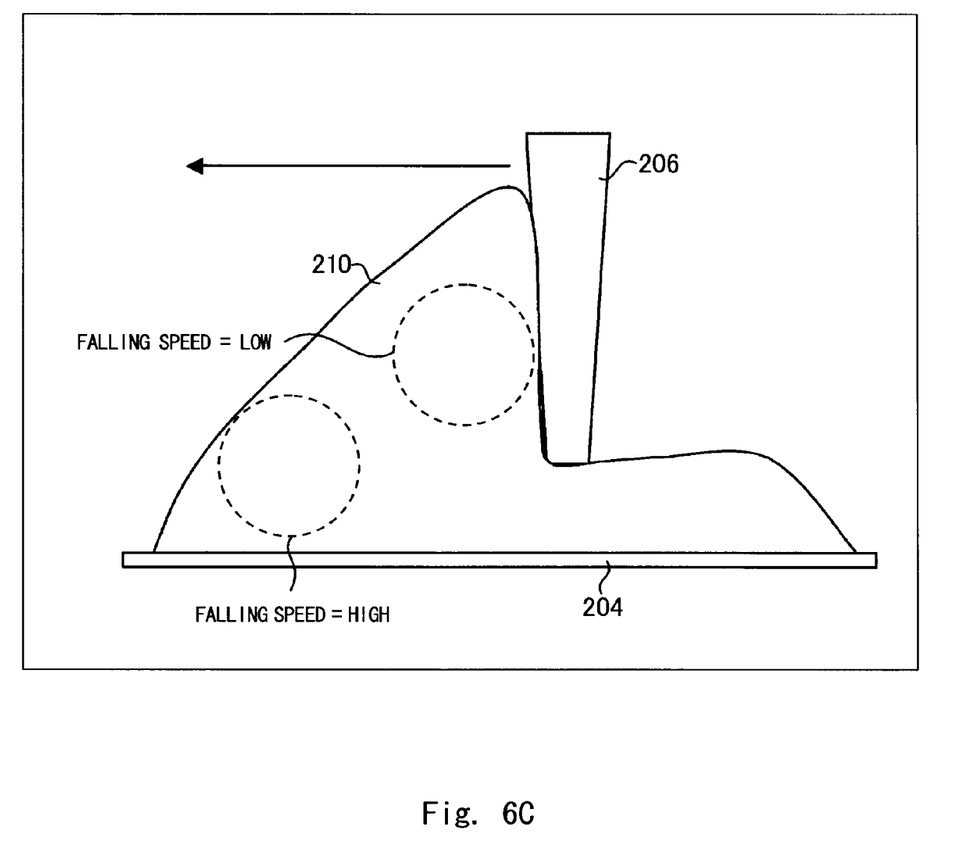
FIG. 6C A view showing a change in the thickness of a resin layer in a stereolithography apparatus according to a related art.

However, a stereolithography apparatus and a stereolithography method that apply a necessary amount of photocurable resin onto a stereolithography table (which is also referred to hereinafter simply as a table), particularly when the thickness of one layer is as thin as 50 μm or less, liquid photocurable resin which is accumulated on the front of a recoater in the moving direction of the recoater ceases to be sufficiently supplied between the recoater and the stereolithography table as the recoater moves, thus failing in the accurate formation of a three-dimensional model. Such drawback is described hereinafter with reference to FIGS. 6A to 6C. FIGS. 6A to 6C are sectional views showing the process of stereolithography. FIG. 6A illustrates the state immediately after starting the application of liquid photocurable resin that is supplied onto a stereolithography table. FIG. 6B illustrates the state after spreading the dipped photocurable resin by a recoater. Although there is no cured resin layer on the stereolithography table 204 in FIGS. 6A to 6C for simplification, the following description also applies when one or more cured resin layers are formed in the same way except that the top surface of the stereolithography table 204 in FIGS. 6A to 6C is viewed as the top surface of an uppermost cured resin layer. As one of specific examples of a stereolithography method in which the thickness of one layer is as thin as 50 μm or less, there is a stereolithography method that repetitively performs one-shot exposure on a certain range of area (which is referred to hereinafter as a projection region) using a digital mirror device (DMD), for example.

Referring to FIG. 6A, photocurable resin 210 is supplied onto the stereolithography table 204. Then, a recoater 206 is moved in the direction indicated by the arrow in the drawing, thereby spreading the photocurable resin 210. At this time, a certain amount of the photocurable resin 210 is accumulated in the front of the recoater 206 in its moving direction. Thus, the falling speed toward the stereolithography table differs between the liquid resin which is in contact with the recoater 206 and the liquid resin which is apart from the recoater 206 (cf. FIG. 6C). When the recoater 206 is close to a resin supply position and a large amount of liquid resin is attached onto the front of the recoater 206 in its moving direction, the movement of resin is large even in the position where the falling speed is low, so that a sufficient amount of the liquid resin is supplied between the recoater 206 and the stereolithography table 204, thus keeping the thickness of a resin layer constant. However, as the recoater 206 moves, the amount of the liquid resin which is attached onto the front of the recoater 206 in its moving direction decreases, and the moving speed of the resin near the surface of the recoater 206 becomes smaller. Accordingly, the thickness of a resin layer gradually decreases. Consequently, in the state where the photocurable resin 210 is spread, the thickness of the photocurable resin 210 is not uniform as shown in FIG. 6B. If light is applied in such a state, an uneven thickness of cured resin layer is formed, which resulting in failure to obtain a desired three-dimensional shape.

The present invention has been accomplished to solve the above problems and an object of the present invention is thus to provide a stereolithography apparatus and a stereolithography method which are capable of ensuring high stability and high productivity of the stereolithography apparatus and a stereolithography model and capable of performing highly accurate stereolithography by accurately controlling the thickness of each layer even when the thickness of one layer is as thin as 50 μm or less.

Means for Solving the Problems

According to an embodiment of the present invention, there is provided a stereolithography apparatus that forms a three-dimensional model by selectively applying light to liquid photocurable resin to form a cured resin layer and sequentially laminating cured resin layers, which includes a table, a dispenser to supply the liquid photocurable resin to the table, a recoater to apply the photocurable resin on the table, and a controller to change a moving speed of the recoater during application operation of the recoater. The moving speed is preferably changed to slow down based on a moving distance. Further, the change in the moving speed is preferably in a parabolic, step-like or linear fashion in light of accuracy and controllability.

According to an embodiment of the present invention, there is provided a stereolithography method that forms a three-dimensional model by selectively applying light to liquid photocurable resin to form a cured resin layer and sequentially laminating cured resin layers, which includes a step of supplying the liquid photocurable resin onto a table, and a step of applying the liquid photocurable resin onto the table while changing a moving speed of a recoater. The moving speed is preferably changed to slow down based on a moving distance. Further, the change in the moving speed is preferably in a parabolic, step-like or linear fashion in light of accuracy and controllability. The slow down of the moving speed based on the moving distance indicates that the speed slows down in a large part of one-time sweep of the recoater. Thus, it does not indicate an instantaneous change in speed such as when the moving speed sharply increases from zero immediately after the start and the moving speed sharply decreases to zero immediately before the end because the speed of the recoater is zero at the start and the end of one-time sweep. Further, there may be a portion in which the moving speed increases in one-time sweep of the recoater as long as the speed slows down as a whole if it does not degrade the effect of the present invention.

According to an embodiment of the present invention, there is provided a stereolithography apparatus that forms a three-dimensional model by selectively applying light to liquid photocurable resin to form a cured resin layer and sequentially laminating cured resin layers, which includes a table, a dispenser to supply the liquid photocurable resin onto the table, a recoater to apply the photocurable resin onto the table, and a controller to enlarge a distance between a leading end of the recoater and a top surface of the table during application operation of the recoater. The distance between the leading end of the recoater and the top surface of the table is preferably enlarged based on a moving distance of the recoater in a parallel direction to the top surface of the table. The enlargement of the distance between the leading end of the recoater and the top surface of the table based on the moving distance indicates that the distance increases in a large part of one-time sweep of the recoater. There may be a portion in which the distance decreases in one-time sweep of the recoater as long as it increases as a whole if it does not degrade the effect of the present invention.

According to an embodiment of the present invention, there is provided a stereolithography method that forms a three-dimensional model by selectively applying light to liquid photocurable resin to form a cured resin layer and sequentially laminating cured resin layers, which includes a step of supplying the liquid photocurable resin onto a table, and a step of applying the liquid photocurable resin onto the table while changing a distance between a leading end of a recoater and a top surface of the table.

ADVANTAGES OF THE INVENTION

The stereolithography apparatus and the stereolithography method of the present invention prevent the occurrence of a difference in thickness in one resin layer and thereby enable the formation of a highly accurate three-dimensional model.

DESCRIPTION OF REFERENCE NUMERALS

1 Light source
2 DMD
3 Lens
4 Stereolithography table
5 Dispenser
6 Recoater
7 Controller
8 Memory
9 Recoater operation controller
10 Liquid resin
11 Curable resin
100 Stereolithography apparatus
204 Stereolithography table
206 Recoater
210 Photocurable resin

BEST MODES FOR CARRYING OUT THE INVENTION

Preferred embodiments of the present invention are described hereinbelow. The explanation provided hereinbelow merely illustrates the embodiments of the present invention, and the present invention is not limited to the below-described embodiments. The description hereinbelow is appropriately shortened and simplified to clarify the explanation. A person skilled in the art will be able to easily change, add, or modify various elements of the below-described embodiments, without departing from the scope of the present invention.

First Embodiment

Figure 1:
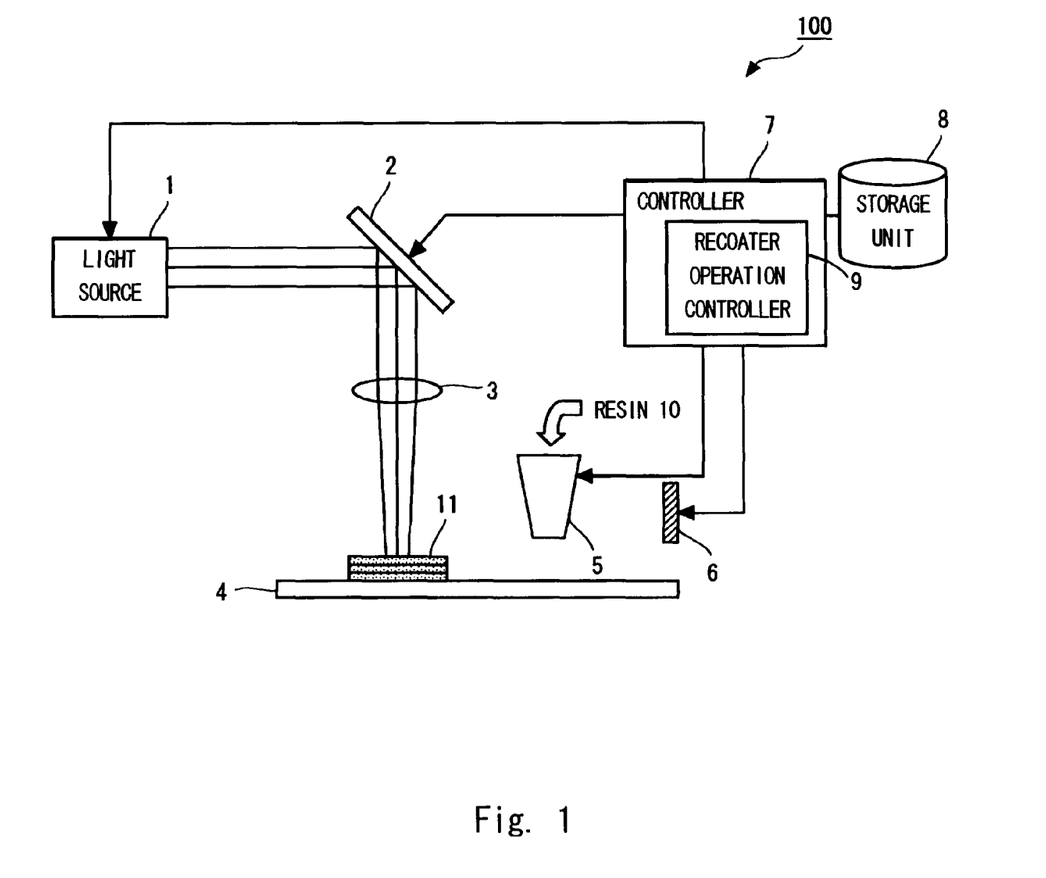
FIG. 1 A view showing the overall structure of a stereolithography apparatus according to an embodiment of the present invention.

An example of a photo-curing stereolithography apparatus (which is referred to hereinafter as a stereolithography apparatus) is described hereinafter with reference to FIG. 1. The stereolithography apparatus uses a stereolithography method that repetitively performs one-shot exposure on a certain range of area (which is referred to hereinafter as a projection region) with use of a digital mirror device (DMD) as described above. A stereolithography apparatus 100 includes a light source 1, a digital mirror device (DMD) 2, a lens 3, a stereolithography table 4, a dispenser 5, a recoater 6, a controller 7, and a memory 8. The stereolithography apparatus 100 of this embodiment includes, in the controller 7, a recoater operation controller 9 which controls the operation of the recoater 6.

The light source 1 emits light for curing a photocurable resin 11. The light source 1 may be a laser diode (LD) or an ultraviolet (UV) lamp which emits laser light with a wavelength of 405 nm, for example. The kind of the light source 1 is selected in conjunction with a curing wavelength of photocurable resin, and the stereolithography apparatus and the stereolithography method of the present invention do not limit the light source 1 to any kind.

The digital mirror device (DMD) 2 is a device which is developed by Texas Instruments, Inc., in which several hundreds of thousands to several millions of, e.g., 480 to 1310 thousands of, independently-driven micromirrors are arrayed on a CMOS semiconductor. Such micromirrors can be inclined at about ±10 degrees, e.g. ±12 degrees, around a diagonal line by the electrostatic field. Each micromirror has a rectangular shape with one side of about 10 μm, e.g. 13.68 μm, in length. An interval between adjacent micromirrors is 1 μm, for example. The DMD 2 which is used in the first embodiment has a rectangular shape of 40.8×31.8 mm as a whole (a mirror part has a rectangular shape of 14.0×10.5 mm), and it is composed of 786,432 micromirrors, one side of each having a length of 13.68 μm. The DMD 2 reflects a laser beam which is emitted from the light source 1 by each micromirror, so that only the laser light which is reflected by a micromirror that is controlled at a given angle by the controller 7 is applied to the photocurable resin 11 on the stereolithography table 4 through the condenser lens 3.

The lens 3 directs the laser beam which is reflected by the DMD 2 onto the photocurable resin 11 to form a projection region. The lens 3 may be a condenser lens using a convex lens or a concave lens. The use of the concave lens allows the formation of a projection region that is larger than an actual size of the DMD 2. The lens 3 of the first embodiment is a condenser lens, which condenses the incident light at a magnification of about 8 times and focuses the light on the photocurable resin 11.

The stereolithography table 4 is a flat support on which cured resins are sequentially deposited and placed. The stereolithography table 4 is horizontally and vertically movable by a driving mechanism, or a moving mechanism, which is not shown. The driving mechanism enables stereolithography over a desired range.

The dispenser 5 contains liquid photocurable resin 10 and supplies a predetermined amount of the liquid photocurable resin 10 to a prescribed position.

The recoater 6 includes a moving mechanism and evenly applies the photocurable resin 10. The moving mechanism of the recoater 6 of this embodiment may be a pulse control motor that operates based on a received pulse signal or the like. The recoater 6 of this embodiment is horizontally and vertically movable.

The controller 7 controls the light source 1, the DMD 2, the stereolithography table 4 and the dispenser 5 according to control data that contains exposure data. The controller 7 further controls the operation of the recoater 6 through the recoater operation controller 9. Typically, the controller 7 may be realized by installing a given program onto a computer. A typical computer configuration includes a central processing unit (CPU) and a memory. The CPU and the memory are connected to an external storage device, such as a hard disk device as an auxiliary storage device, through a bus. The external storage device serves as the memory 8 of the controller 7. A storage medium driving device which serves as the memory 8, such as a flexible disk device, a hard disk device or a CD-ROM drive, is connected to the bus through a controller of each type. A portable storage medium, such as a flexible disk, is inserted into the storage medium driving device such as a flexible disk device. The storage medium may store a given computer program that gives a command to a CPU or the like in cooperation with an operating system to implement the present embodiment.

The memory 8 stores control data which contains exposure data of cross sections which are obtained by slicing a three-dimensional model to be formed into a plurality of layers. The controller 7 mainly controls the angle of each micromirror in the DMD 2 and the movement of the stereolithography table 4 (i.e. the position of the laser beam exposure range on a three-dimensional model) based on the exposure data that are stored in the memory 8, thereby executing the formation of a three-dimensional model.

A computer program is executed by being loaded to a memory. The computer program may be stored in a storage medium by being compressed or divided into a plurality of pieces. Further, a user interface hardware may be provided. The user interface hardware may be a pointing device for inputting data such as a mouse, a keyboard, a display for presenting visual data to a user, or the like.

The recoater operation controller 9 is a portion which is controllable by software that operates on the controller 7, for example. If the moving mechanism of the recoater is a pulse control motor as described above, for example, the recoater operation controller 9 may be a unit that generates a pulse signal according to control from software. The recoater operation controller 9 generates a signal for controlling the moving speed and the moving distance of the recoater 6 or generates a signal for controlling the horizontal and vertical movement of the recoater 6 according to instruction from software or the like. The recoater 6 thus can change the moving speed or perform vertical movement.

The liquid photocurable resin 10 may be a resin that is cured by visible light and light outside the visible light spectrum. For example, acrylic resin with a cure depth of 15 μm or less (500 mJ/cm$^2$) and a viscosity of 1500 to 2500 Pa·s (25° C.), which is responsive to a wavelength of 405 nm, may be used.

Stereolithography operation of the stereolithography apparatus 100 according to this embodiment is described hereinafter. Firstly, the liquid photocurable resin 10 in a non-cured state is poured into the dispenser 5. The stereolithography table 4 is located at an initial position. The dispenser 5 supplies a predetermined amount of the liquid photocurable resin 10 onto the stereolithography table 4. The recoater 6 sweeps to spread the liquid photocurable resin 10, thereby forming one coating layer to be cured. In this embodiment, in one-time sweep of the recoater 6 to spread the liquid photocurable resin 10, the moving speed of the recoater 6 changes. Specifically, it changes in such a way that the sweeping speed gradually slows down in one-time sweep from right to left of the drawings. The speed control is described in detail later.

A laser beam which is emitted form the light source 1 is incident on the DMD 2. The DMD 2 is controlled by the controller 7 so as to adjust the angle of a micromirror which corresponds to a part of the liquid photocurable resin 10 which is to be exposed to a laser beam. A laser beam which is reflected by the relevant micromirror is thereby applied to the liquid photocurable resin 10 through the condenser lens 3, and laser beams which are reflected by other micromirrors are not applied to the liquid photocurable resin 10. The application of a laser beam to the liquid photocurable resin 10 may be performed for 0.4 seconds, for example. A projection region on the photocurable resin 11 is about 1.3×1.8 mm, for example, and it may be reduced to about 0.6×0.9 mm. In general, the area of the projection region is preferably 100 mm$^2$ or smaller. Thus, when forming a three-dimensional model which is larger than the size of one projection region, it is necessary to move the exposure position of a laser beam.

For example, if a maximum size of stereolithography is (X×Y), it is divided into a plurality of projection regions (x×y), and a laser beam is applied one shot at a time in each projection region. The maximum size of stereolithography may be X=150 mm and Y=150 mm, and a height is 50 mm, for example. The size of each projection region may be x=1.8 mm and y=1.3 mm, for example. In this manner, the application of a laser beam with the scanning of projection regions causes the liquid photocurable resin 10 to be cured, thereby forming a first cured resin layer. The lamination pitch of one layer, which is the thickness of a single cured resin layer, may be, for example, 1 to 50 μm, preferably 2 to 10 μm, and more preferably 5 to 10 μm.

Next, a second layer of a three-dimensional model with a desired shape is formed in the same process. Specifically, the liquid photocurable resin 10, which is supplied from the dispenser 5 6 on the outside of the three-dimensional model which is formed as a first layer, is applied with a uniform thickness by the recoater in such a way that it spreads over the three-dimensional model of the first layer. Then, a laser beam is applied to thereby form a second cured resin layer on top of the first cured resin layer. After that, third and subsequent cured resin layers are deposited sequentially in the same manner. When the deposition of a final layer is finished, a model which is formed on the stereolithography table 4 is taken out. The liquid photocurable resin which is attached onto the surface of the model is removed by cleaning or the like, and, if necessary, the model may be heated to further promote the curing.

The above-described operation of gradually slowing down the speed of the recoater 6 in one-time sweep is described hereinafter in detail. When spreading resin using the recoater 6, the falling speed of the resin toward a table is low in the portion where the resin is in contact with the recoater, and the falling speed of the resin toward the table is high in the portion where the resin is not in contact with the recoater. Therefore, as the recoater 6 sweeps, the thickness of the resin gradually decreases disadvantageously as described above. In light of such a difference in the falling speed of resin, the present embodiment maximizes the moving speed of the recoater at each start of the application of the resin with the recoater and then reduces the speed, thereby spreading the resin over a necessary range. With such a change in speed in one-time sweep, it enables control such that a sufficient amount of resin that is enough to maintain the thickness falls even in the part where the moving speed of liquid resin is low.

Figure 2:
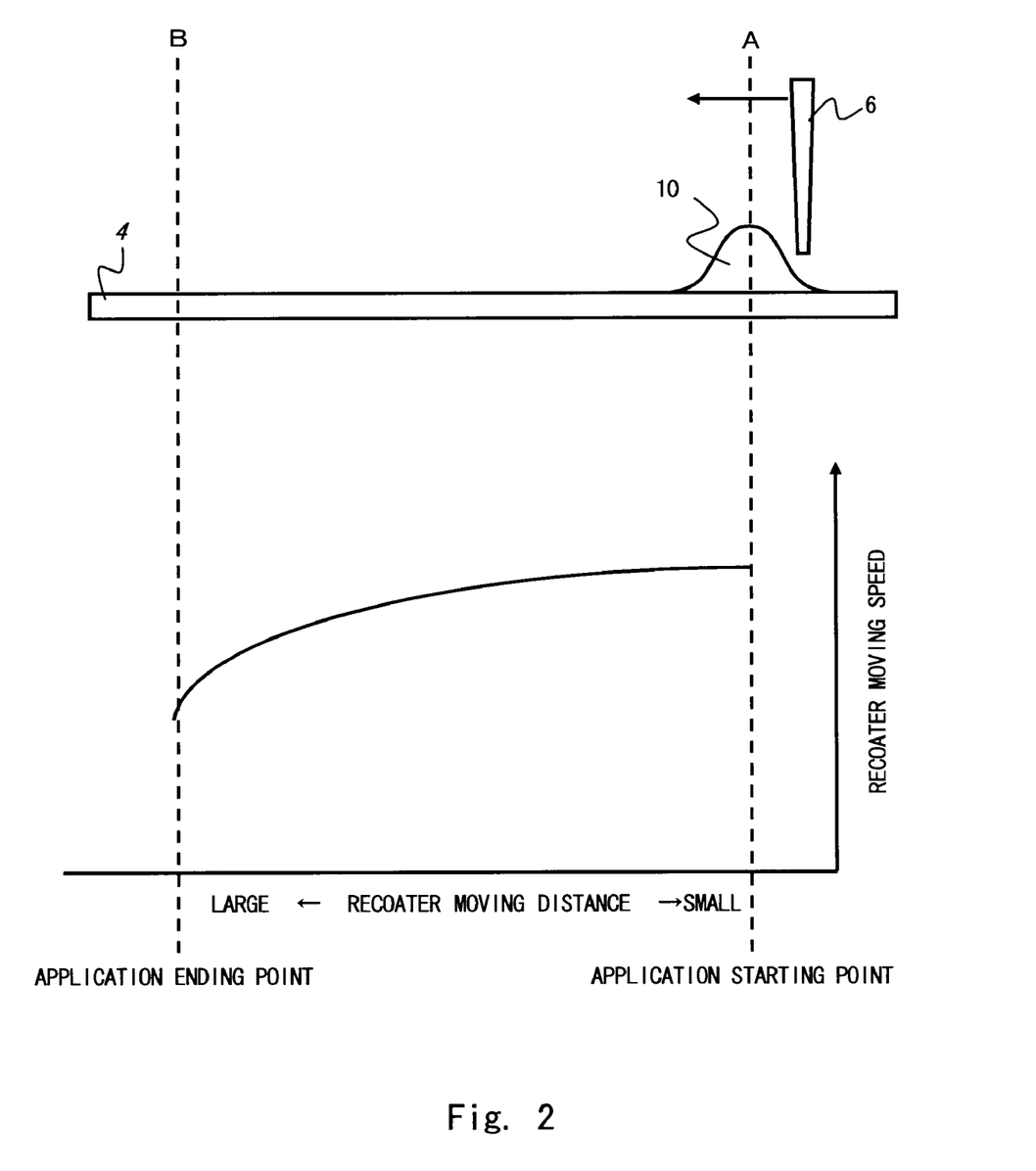
FIG. 2 A view showing the moving distance and the moving speed of a recoater according to a first embodiment of the present invention.

FIG. 2 is a view showing the relationship between the moving speed of the recoater and the moving distance of the recoater in the first embodiment of the present invention. As shown in FIG. 2, in the first embodiment, the recoater is controlled in such a way that the speed of the recoater exhibits a parabolic change with respect to the moving distance of the recoater from a portion A where the resin is in contact with the recoater (a starting point of resin application) toward a point B where the spread of resin finishes (an ending point of application). Although a difference in the moving speed of resin between the portion that is in contact with the recoater and the portion that is apart from the recoater differs depending on the viscosity of the resin, the amount of the resin, the contact area and so on, it can be estimated specifically on the basis of Hagen-Poiseuille's law (e.g. cf. Iwanami's Dictionary of Physic chemistry, 4th Edition, edited by Ryogo Kubo et. al. published in 1987 and issued by Iwanami Shoten). Because the difference in speed basically changes in a parabolic fashion, it is possible to form a resin layer having a uniform thickness by changing the moving speed in one-time sweep in a parabolic manner. The same speed control is performed on the second and subsequent resin layers, thereby laminating the resin layers with a uniform thickness.

As described in detail above, the speed control of the recoater enables the uniform formation of each layer of a three-dimensional model which is composed of multiple photocurable resin layers. It is thereby possible to form a highly accurate three-dimensional model.

Second Embodiment

Figure 3:
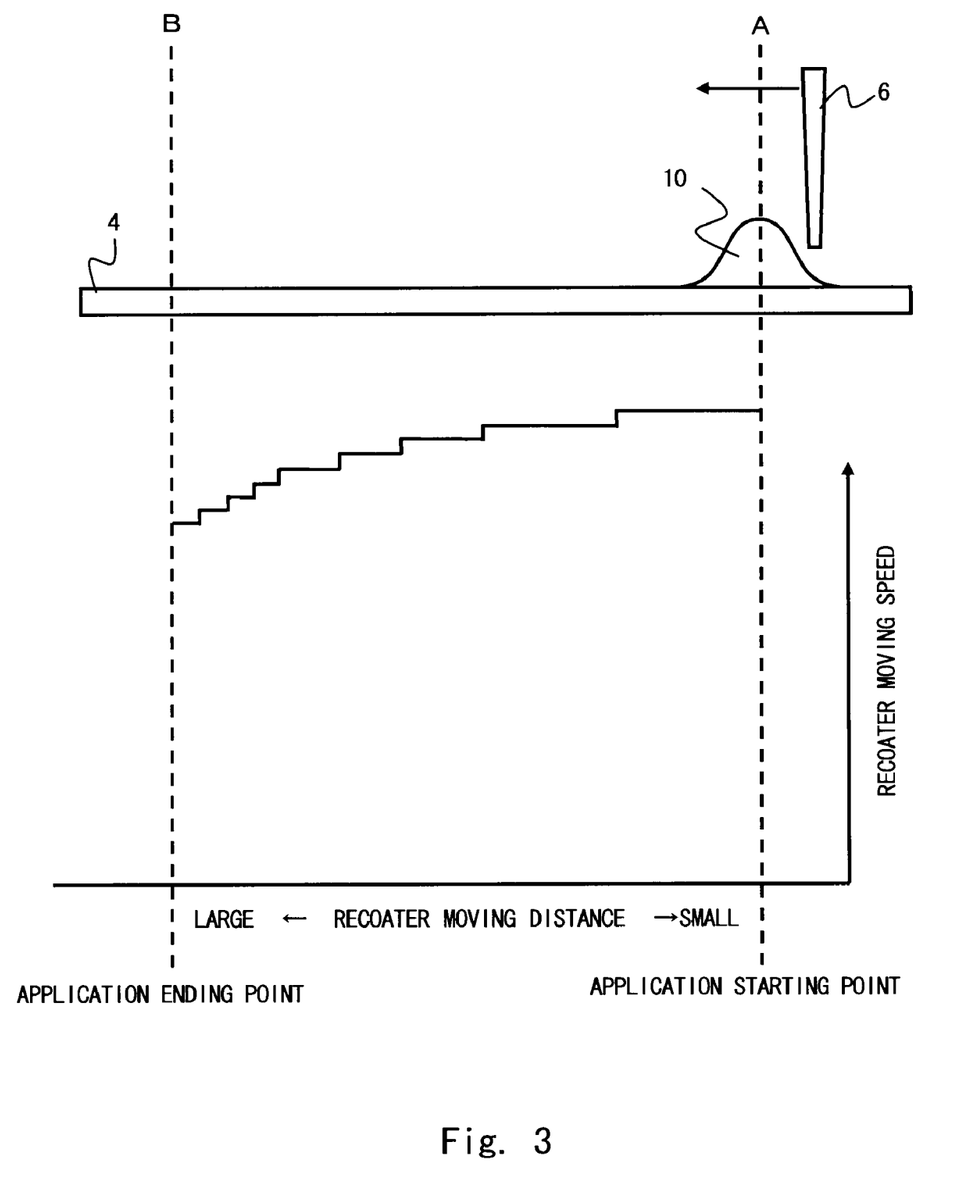
FIG. 3 A view showing the moving distance and the moving speed of a recoater according to a second embodiment of the present invention.

FIG. 3 is a view showing the relationship between the speed and the moving distance of a recoater according to a second embodiment of the present invention. This embodiment is different from the first embodiment only in the speed control of the recoater, and the other points are the same and thus not described in detail herein.

The second embodiment is same as the first embodiment in that it slows down the speed of the recoater in one-time sweep. Although the first embodiment changes the speed in a parabolic fashion, the second embodiment changes the speed in a step-like fashion.

As described earlier, a stereolithography apparatus moves a recoater by a motor which is controlled according to a pulse or the like. Generally, extremely complicated control is required in a pulse control motor or the like in order to convert its rotation speed in a parabolic manner. On the other hand, if a constant speed is maintained for a prescribed period of time and the speed is changed step-like, it only needs to prepare a table that associates a moving distance with a speed in the memory 8, for example, thus allowing easy speed control.

In light of this, the second embodiment performs stereolithography by preparing a plurality of such tables in the memory 8 or the like and selecting a table which is appropriate for a three-dimensional model to be formed during stereolithography. This facilitates the speed control of the recoater, thereby improving the productivity in the manufacture of a three-dimensional model.

The number of steps included in one-time sweep of the recoater and the degree of slow down of the moving speed of the recorder in each step may be appropriately determined in the range that does not degrade the effect of the present invention. In the case of slowing down the moving speed of the recoater in a step-like fashion also, it is preferred that the speed exhibits a parabolic change in one-time sweep of the recoater as a whole.

Third Embodiment

Figure 4:
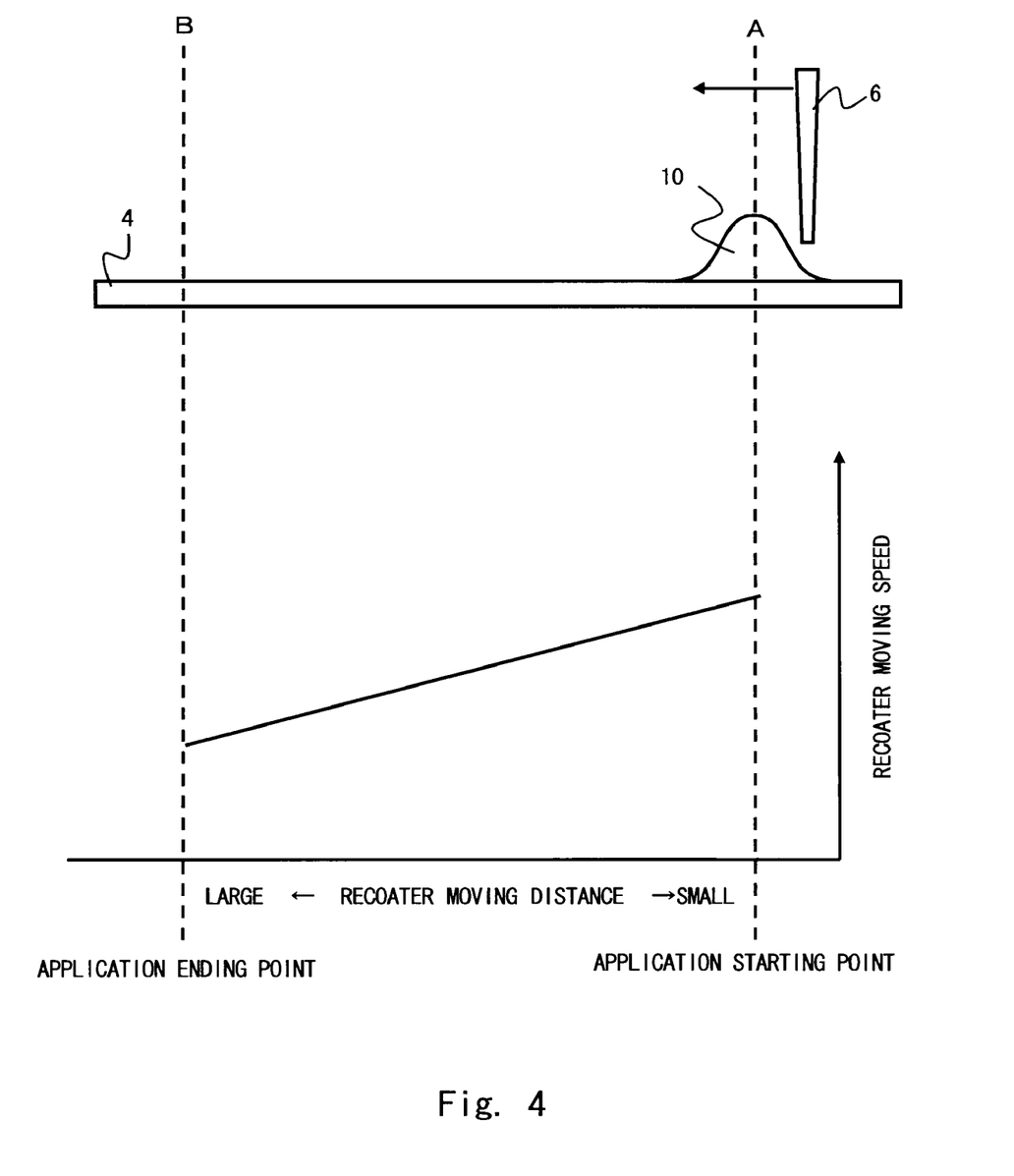
FIG. 4 A view showing the moving distance and the moving speed of a recoater according to a third embodiment of the present invention.

FIG. 4 is a view showing the relationship between the speed and the moving distance of a recoater according to a third embodiment of the present invention. This embodiment is different from the other embodiments only in the speed control of the recoater, and the other points are the same and thus not described in detail herein.

In the third embodiment, the moving speed of the recoater changes linearly with respect to the moving distance. Although the third embodiment requires the preparation of the table which associates the moving distance with the speed, this embodiment only requires the setting of an initial speed at a starting point of resin application and a final speed at an ending point of application to apply resin with a speed slowing down in one-time sweep. In the case of linearly changing the moving speed of the recoater as in this embodiment, only a slow down rate may be designated if a speed at a starting point of resin application is constant.

Such a control further facilitates the speed control of the recoater. When moving a recoater by a motor, the productivity of a three-dimensional model is further improved because a motor can extremely easily slow down at a constant slow down rate.

As described in detail above, the speed control of the recoater enables the uniform formation of each layer of a three-dimensional model which is composed of multiple photocurable resin layers. The experimental test by the inventors of the present invention showed that a difference in the thickness of one layer can be 1 µm or smaller even if each layer of resin which is laminated by the stereolithography method is several µm, thereby enabling highly accurate stereolithography.

According to the above-described first to third embodiments, the speed control of the recoater enables the uniform formation of each layer of a three-dimensional model which is composed of multiple photocurable resin layers. This allows the formation of a highly accurate three-dimensional model. In the fourth embodiment below, a method that maintains the thickness of a layer by moving a recoater upward is described.

Figure 5:
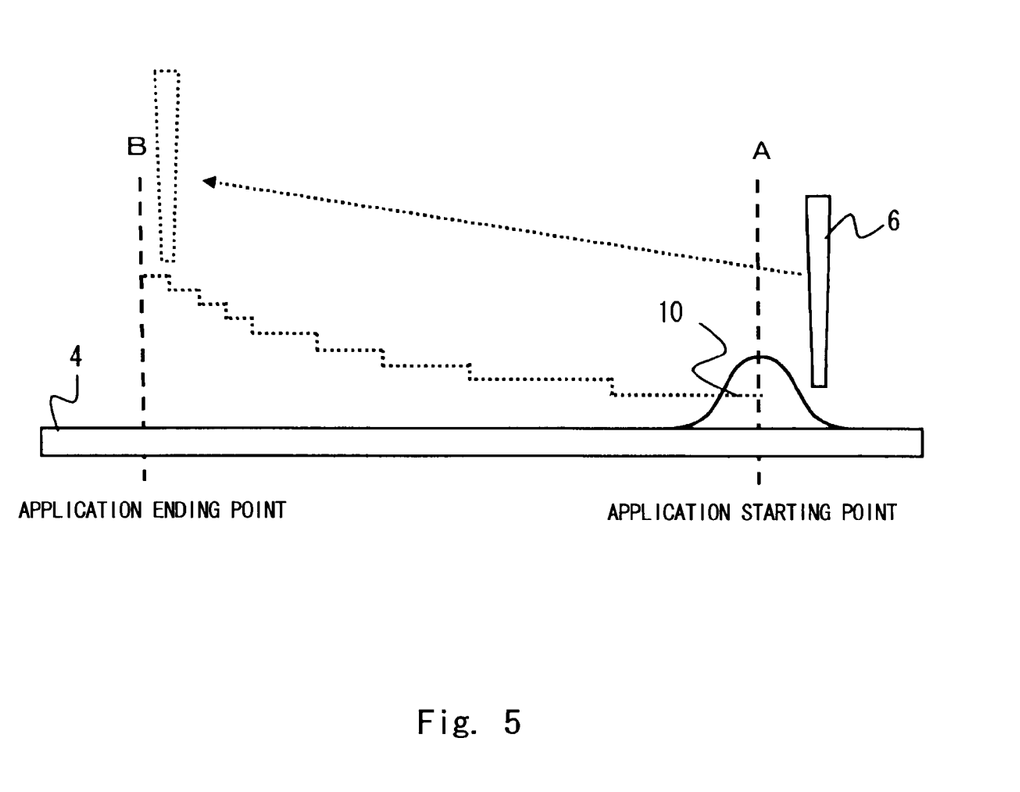
FIG. 5 A view showing the horizontal and vertical moving distances of a recoater according to a fourth embodiment of the present invention.

In this embodiment, the recoater 6 moves in the vertical direction in one-time sweep to spread the liquid photocurable resin 10. Specifically, in one-time sweep from right to left of the drawing, the recoater gradually moves upward. The vertical movement is described in detail hereinbelow.

When spreading resin using the recoater 6, the falling speed of the resin toward the table is low in the portion where the resin is in contact with the recoater, and the falling speed of the resin toward the table is high in the portion where the resin is not in contact with the recoater. Therefore, as the recoater 6 sweeps, the thickness of the resin gradually decreases as described earlier. In light of this, the fourth embodiment moves the recoater in such a way that the interval between the leading end of the recoater and the table or the surface of a cured resin layer gradually becomes larger.

Specifically, at each start of the application of resin with a recoater, the interval between the table (or the surface of a resin layer) and the recoater 6 is smallest, and then the recoater gradually moves upward and also moves in the horizontal direction which is in parallel with the table surface. In this manner, this embodiment controls so as to maintain the layer thickness by moving the recoater upward in one-time sweep.

FIG. 5 is a view showing the relationship of the interval between the leading end of the recoater and the table (or the surface of a resin layer) with the moving distance of a blade. As shown in FIG. 5, in the fourth embodiment, the recoater is controlled to gradually move upward from a portion A where the resin is in contact with the recoater (a starting point of resin application) toward a point B where the spread of resin finishes (an ending point of application). Although the way of moving upward may be altered in various manners depending on the viscosity of the resin, the amount or kind of the resin and so on, the recoater, for example, may move upward so that the interval (y) from the leading end of the recoater to the table or the surface of a cured resin layer is a quadratic function of the moving distance (x) of the recoater. The quadratic function in this case is generally represented as: $x=\alpha y^2+\beta y+\gamma$. In the function, $\alpha$ is a positive constant, $\beta$ is a constant of zero or above, and $\gamma$ is an initial value of y at the start of resin application, which is a constant of zero or above. The values of $\alpha$, $\beta$ and $\gamma$ can be determined appropriately according to the viscosity of the resin, the amount or kind of the resin and so on. With such a quadratic function, y increases as x increases. Further, the recoater may move upward in a step-like or linear fashion in consideration of a device structure or controllability. FIG. 5 shows the state where the recoater moves upward in a step-like fashion. In the case of moving the recoater in a step-like fashion, the number of steps included in one-time sweep of the recoater and the amount of an increase in the interval between the leading end of the recoater and the table or the surface of a cured resin layer in each step may be appropriately determined in the range that does not degrade the effect of the present invention. In the case of increasing the interval between the leading end of the recoater and the table or the surface of a cured resin layer in a step-like fashion also, it is preferred that the interval increases in a quadratic function as described above in one-time sweep of the recoater as a whole.

The operation of the recoater in the fourth embodiment may be implemented by preparing, in the memory 8, for example, a parameter or the like which sets the vertical movement according to the amount or kind of resin, the layer to be formed and so on. For example, the controller 7 may read information related to the vertical movement from the parameter which is stored in the memory 8 according to the resin layer to be applied, and the recoater operation controller 9 may move the recoater in the vertical direction by software processing, thereby implementing the operation. Alternatively, a parameter that is related to the vertical movement may be input from an external input device of the controller 7, so that the recoater operates based on the parameter.

As described in detail above, moving the recoater vertically in one-time sweep of applying resin enables the uniform formation of each layer of a three-dimensional model which is composed of multiple photocurable resin layers. This allows the formation of a highly accurate three-dimensional model.

As described in detail in the foregoing, the speed control of the recoater enables the uniform formation of each layer of a three-dimensional model which is composed of multiple photocurable resin layers. Further, the vertical movement of the recoater in one-time sweep of applying resin enables the uniform formation of each layer of a three-dimensional model which is composed of multiple photocurable resin layers.

INDUSTRIAL APPLICABILITY

The present invention is applicable to a stereolithography apparatus and a stereolithography method which form a three-dimensional model by sequentially laminating cured resin layers.

The invention claimed is:

1. A stereolithography apparatus that forms a three-dimensional model by sequentially laminating cured resin layers through repetition of a cycle of selectively applying light to liquid photocurable resin to form a cured resin layer, further applying liquid photocurable resin on the cured resin layer and applying light to form a cured resin layer, comprising:
   a table;
   a dispenser to supply the liquid photocurable resin onto the table;
   a recoater to apply a layer of the photocurable resin onto the table or onto a cured resin layer already applied to the table, by moving in a sweep across the surface of the table or across the surface of the cured resin layer already applied to the table; and
   a controller to slow down a moving speed of the recoater during the sweep as a function of a moving distance of the recoater during the sweep such that the moving speed of the recoater at the beginning of the sweep is greater than the moving speed of the recoater at the end of the sweep.

2. The stereolithography apparatus according to claim 1, wherein
the controller slows down the moving speed of the recoater based on the moving distance of the recoater in a parabolic fashion with respect to the moving distance.

3. The stereolithography apparatus according to claim 1, wherein
the controller slows down the moving speed of the recoater based on the moving distance of the recoater in a step-like fashion with respect to the moving distance.

4. The stereolithography apparatus according to claim 1, wherein
the controller slows down the moving speed of the recoater based on the moving distance of the recoater in a linear fashion with respect to the moving distance.

5. The stereolithography apparatus according to claim 1, wherein
a thickness of the cured resin layer formed in each cycle is 2 to 10 μm.

6. A stereolithography method that forms a three-dimensional model by sequentially laminating cured resin layers through repetition of a cycle of selectively applying light to liquid photocurable resin to form a cured resin layer, further applying liquid photocurable resin on the cured resin layer and applying light to form a cured resin layer, comprising:
a step of supplying the liquid photocurable resin in each cycle; and
a step of applying a layer of the liquid photocurable resin by sweeping a recoater, with a moving speed of the recoater being slowed down during the sweep as a function of a moving distance of the recoater during the sweep, such that the moving speed of the recoater at the beginning of the sweep is greater than the moving speed of the recoater at the end of the sweep.

7. The stereolithography method according to claim 6, wherein
the moving speed of the recoater slows down in a parabolic fashion based on the moving distance of the recoater.

8. The stereolithography method according to claim 6, wherein
the moving speed of the recoater slows down in a step-like fashion based on the moving distance of the recoater.

9. The stereolithography method according to claim 6, wherein
the moving speed of the recoater slows down in a linear fashion based on the moving distance of the recoater.

10. The stereolithography method according to claim 6, wherein
a thickness of the cured resin layer formed in each cycle is 2 to 10 μm.

11. The stereolithography method according to claim 10, wherein
the application of light is performed by repeating one-shot exposure on each projection region.

12. A stereolithography apparatus that forms a three-dimensional model by sequentially laminating cured resin layers through repetition of a cycle of selectively applying light to liquid photocurable resin to form a cured resin layer, further applying liquid photocurable resin on the cured resin layer and applying light to form a cured resin layer, comprising:
a table;
a dispenser to supply the liquid photocurable resin onto the table;
a recoater to apply the photocurable resin; and
a controller to enlarge a distance between a leading end of the recoater and a top surface of the table based on a moving distance of the recoater in a parallel direction to the top surface of the table during application operation of the recoater.

13. The stereolithography apparatus according to claim 12, wherein
the controller enlarges the distance between the leading end of the recoater and the top surface of the table in a quadratic function of the moving distance of the recoater in the parallel direction to the top surface of the table.

14. The stereolithography apparatus according to claim 12, wherein
the controller changes the distance between the leading end of the recoater and the top surface of the table in a step-like fashion based on the moving distance of the recoater in the parallel direction to the top surface of the table.

15. The stereolithography apparatus according to claim 12, wherein
the controller changes the distance between the leading end of the recoater and the top surface of the table in a linear fashion based on the moving distance of the recoater in the parallel direction to the top surface of the table.

16. The stereolithography apparatus according to claim 12, wherein
a thickness of the cured resin layer formed in each cycle is 2 to 10 μm.

17. A stereolithography method that forms a three-dimensional model by selectively applying light to liquid photocurable resin to form a cured resin layer and sequentially laminating cured resin layers, comprising:
a step of supplying the liquid photocurable resin onto a table; and
a step of applying the liquid photocurable resin with a distance between a leading end of a recoater and a top surface of the table being enlarged based on a moving distance of the recoater in a parallel direction to the top surface of the table.

18. The stereolithography method according to claim 17, wherein
the distance between the leading end of the recoater and the top surface of the table is enlarged in a quadratic function based on the moving distance of the recoater in the parallel direction to the top surface of the table.

19. The stereolithography method according to claim 17, wherein
the distance between the leading end of the recoater and the top surface of the table changes in a step-like fashion based on the moving distance of the recoater in the parallel direction to the top surface of the table.

20. The stereolithography method according to claim 17, wherein
the distance between the leading end of the recoater and the top surface of the table changes in a linear fashion based on the moving distance of the recoater in the parallel direction to the top surface of the table.

21. The stereolithography method according to claim 17, further comprising:
a step of reading a parameter related to a change in the distance between the leading end of the recoater and the top surface of the table.

22. The stereolithography method according to claim 17, wherein
a thickness of the cured resin layer formed in each cycle is 2 to 10 μm.

23. The stereolithography method according to claim 22, wherein
the application of light is performed by repeating one-shot exposure on each projection region.

* * * * *